(12) United States Patent
Stumpp et al.

(10) Patent No.: US 11,215,219 B2
(45) Date of Patent: Jan. 4, 2022

(54) HINGE

(71) Applicant: Lohr Technologies GmbH, Heiligenhaus (DE)

(72) Inventors: Lukas Stumpp, Paderborn (DE); Stefan Lohr, Bad Salzuflen (DE)

(73) Assignee: Lohr Technologies GmbH, Heiligenhaus (DE)

( * ) Notice: Subject to any disclaimer, the term of this patent is extended or adjusted under 35 U.S.C. 154(b) by 0 days.

(21) Appl. No.: 16/464,844

(22) PCT Filed: Dec. 4, 2017

(86) PCT No.: PCT/EP2017/081344
§ 371 (c)(1),
(2) Date: May 29, 2019

(87) PCT Pub. No.: WO2018/100204
PCT Pub. Date: Jun. 7, 2018

(65) Prior Publication Data
US 2019/0301521 A1 Oct. 3, 2019

(30) Foreign Application Priority Data
Dec. 2, 2016 (DE) .......................... 102016123297.1

(51) Int. Cl.
*E05D 11/00* (2006.01)
*E05D 7/00* (2006.01)
(Continued)

(52) U.S. Cl.
CPC .............. *F16C 11/04* (2013.01); *F16C 33/08* (2013.01); *F16C 33/201* (2013.01); *F16C 33/80* (2013.01); *F16C 35/02* (2013.01); *F16C 2226/30* (2013.01)

(58) Field of Classification Search
CPC . Y10T 16/537; Y10T 16/5373; Y10T 16/557; Y10T 16/558; Y10T 16/524;
(Continued)

(56) References Cited

U.S. PATENT DOCUMENTS 3,065,035 A * 11/1962 Biesecker ............... E05D 7/081
384/296
3,250,556 A * 5/1966 Couch .................. F16C 11/0633
403/131
(Continued)

FOREIGN PATENT DOCUMENTS

DE 1286822 B * 1/1969 .............. F16C 33/20
DE 2733669 9/1978
(Continued)

OTHER PUBLICATIONS

International Search Report with English Translation issued in the corresponding International Patent Application No. PCT/EP2017/081344, dated May 9, 2018 (6 pages).
(Continued)

*Primary Examiner* — Chuck Y Mah
(74) *Attorney, Agent, or Firm* — Adams and Reese LLP; Raymond R. Ferrera

(57) ABSTRACT

The invention relates to a hinge (1) having two hinge arms (2, 3) that can be moved in an articulated manner relative to each other, wherein each hinge arm accommodates a sliding bearing element (4, 5), and a sliding bearing bushing (6) is situated between the sliding bearing elements. The invention also relates to a method for producing such a hinge. The aim of the invention is to design a hinge which can be produced easily and with precision and has high durability.

12 Claims, 3 Drawing Sheets

Figure 1:
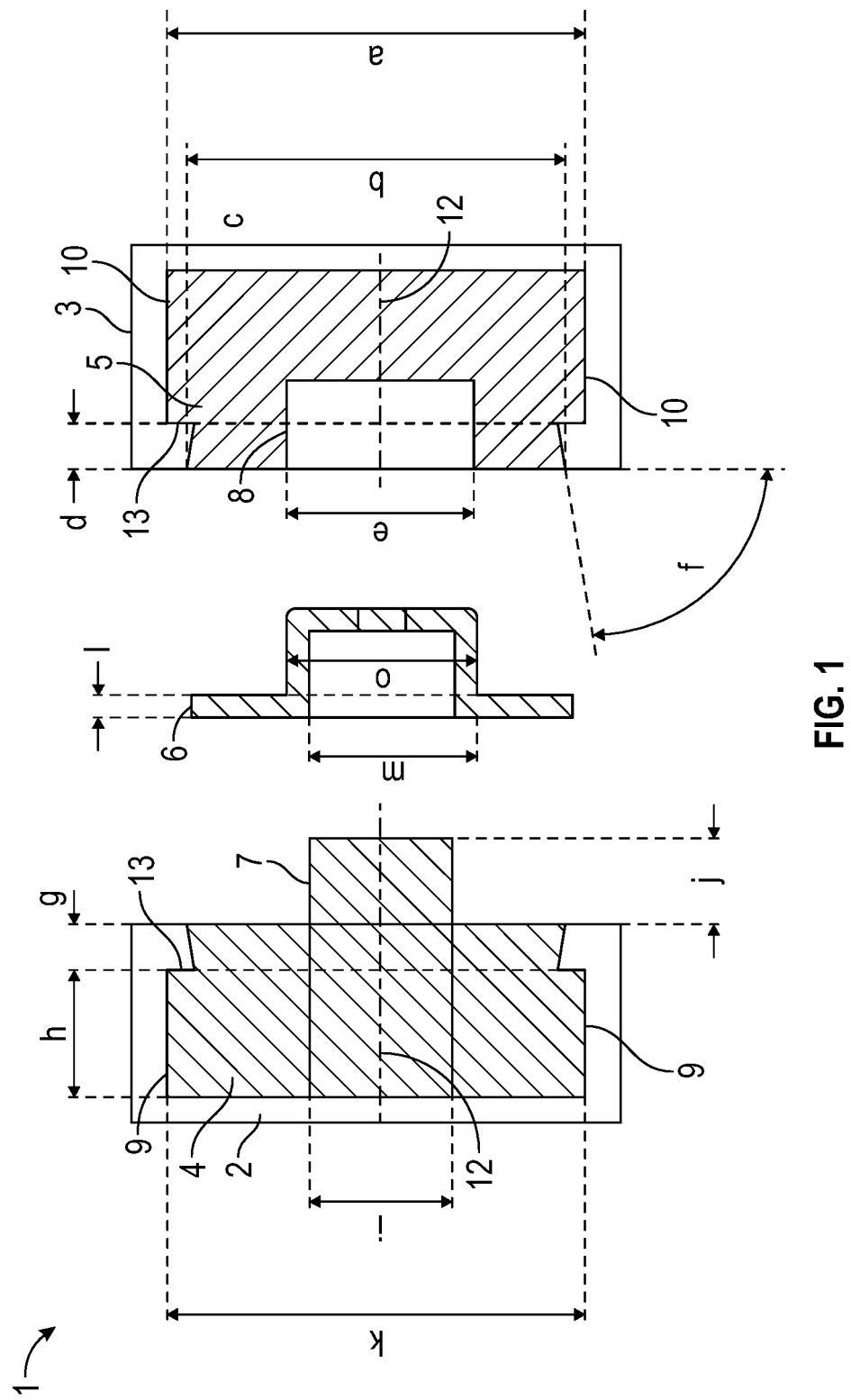

(51) Int. Cl.
  *F16C 11/04* (2006.01)
  *F16C 33/08* (2006.01)
  *F16C 33/20* (2006.01)
  *F16C 33/80* (2006.01)
  *F16C 35/02* (2006.01)

(58) Field of Classification Search
  CPC ....... E05D 15/24; E05D 15/242; E05D 15/16; E05D 15/165; E05D 11/02; E05Y 2900/106; F16C 11/04; F16C 11/045; F16C 11/0628; F16C 11/06; F16C 33/08; F16C 33/201; F16C 33/80; F16C 35/02; F16C 2226/30
  See application file for complete search history.

(56) References Cited

U.S. PATENT DOCUMENTS

| | | | | |
|---|---|---|---|---|
| 3,287,760 A * | 11/1966 | Moore | ............... | E05D 7/1044 16/265 |
| 3,349,427 A * | 10/1967 | Cairns | ............... | E05D 3/02 16/273 |
| 3,499,183 A * | 3/1970 | Parsons | ............... | E05D 5/10 16/273 |
| 3,539,234 A * | 11/1970 | Rapata | ............... | F16C 11/06 384/203 |
| 3,725,973 A * | 4/1973 | Gwozdz | ............... | E05D 5/14 16/273 |
| 3,832,755 A * | 9/1974 | Maertin | ............... | E05D 5/10 16/309 |
| 3,843,272 A * | 10/1974 | Jorn | ............... | F16C 11/0614 403/132 |
| 3,921,225 A * | 11/1975 | Suska | ............... | E05D 3/02 16/273 |
| 4,209,872 A * | 7/1980 | Maier | ............... | A46B 13/02 15/179 |
| 4,720,198 A * | 1/1988 | DeBruyn | ............... | E05D 3/10 16/273 |
| 4,807,330 A * | 2/1989 | Gomes | ............... | A47C 4/40 16/261 |
| 4,930,184 A * | 6/1990 | Kristmanson | ............... | E02B 3/064 114/266 |
| 5,369,842 A * | 12/1994 | Beatty | ............... | E05F 1/063 16/317 |
| 5,427,467 A * | 6/1995 | Sugiura | ............... | F16C 11/0638 403/133 |
| 5,463,795 A * | 11/1995 | Carlson | ............... | E05D 5/14 16/273 |
| 5,930,868 A * | 8/1999 | Butler | ............... | E05D 11/04 16/276 |
| 6,098,248 A | 8/2000 | Saida et al. | | |
| 6,173,475 B1 * | 1/2001 | Senn | ............... | E05D 5/14 16/273 |
| 7,461,432 B2 * | 12/2008 | Lowen | ............... | E05D 11/1071 16/334 |
| 8,864,380 B2 * | 10/2014 | Kurimura | ............... | F16C 17/107 384/107 |
| 2002/0116788 A1 * | 8/2002 | Pompei | ............... | E05F 1/063 16/315 |
| 2006/0075601 A1 * | 4/2006 | Soviknes | ............... | E05D 7/0027 16/243 |
| 2008/0040886 A1 * | 2/2008 | Arnold | ............... | F16C 33/102 16/275 |

FOREIGN PATENT DOCUMENTS

| | | | | |
|---|---|---|---|---|
| DE | 3619004 C1 * | 12/1987 | ............ | F16C 11/068 |
| DE | 102006031616 A1 | 11/2007 | | |
| GB | 629906 A * | 9/1949 | .......... | F16C 11/0633 |

OTHER PUBLICATIONS

Written Opinion of the International Searching Authority with English Translation issued in the corresponding International Patent Application No. PCT/EP2017/081344, dated May 9, 2018 (12 pages).

International Preliminary Report on Patentability issued in the corresponding International Patent Application No. PCT/EP2017/081344, dated Jun. 4, 2019 (7 pages).

* cited by examiner

HINGE

The invention relates to a hinge that comprises two hinge arms that can be displaced in an articulated manner relative to each other.

Such hinges are preferably used in the automotive industry, for example, to connect car doors, hoods or tailgates hinged to the body. Defined and consistent coefficients of friction are required here for haptic reasons. A particularly valuable haptic experience when opening and closing, for example, car doors can be achieved with the choice of the coefficient of friction between the hinge parts.

The invention is based on the object of providing a hinge which is simple and accurate to manufacture, has a defined and consistent coefficient of friction and a long service life.

This object is achieved by a hinge having the features of claim 1 and by a method having the features of claim 12.

Advantageous embodiments are the subject of the dependent claims. It should be noted that the features listed individually in the claims can also be combined with one another in any desired and technologically sensible manner and thus show further embodiments of the invention.

A simple and durable hinge results from the fact that each hinge arm in each case receives a sliding bearing element and a plain bearing bush is arranged between the sliding bearing elements. This is achieved in particular by the fact that both hinge arms are connected to each other by two sliding bearing elements. The coefficient of friction between the sliding bearing elements and the plain bearing bush can be adjusted in a targeted manner with the appropriate choice of the material of the plain bearing bush. A hinge preferably consists of two sliding bearing elements and a lifetime lubrication placed between the sliding bearing elements. The lifetime lubrication is designed as a solid body. The coefficient of friction in the hinge can be adjusted in a targeted manner with the appropriate choice of the material of the sliding bearing elements and the lifetime lubrication.

According to an advantageous embodiment of the invention, it is provided that one of the sliding bearing elements, preferably in the center of the hinge axis, has a centering formation and the other sliding bearing element, preferably in the center of the hinge axis, has a receiving contour receiving the centering formation. On the one hand, this embodiment has the advantage that a very precisely working hinge is provided, and on the other hand, a hinge equipped in this way can very well absorb the occurring or the required shear forces transversely to the hinge axis.

An advantageous embodiment is that the centering formation is configured cylindrical. A cylindrical embodiment of the centering formation facilitates the movement of the hinge arms or sliding bearing elements relative to one another, since they are thereby optimally aligned with one another.

A preferred embodiment provides that the sliding bearing elements are conically formed in the center on the outer sides and form a circumferential gable. The sliding bearing elements can be particularly well and safely received by the hinge arms with the conical embodiment in the middle of the outer sides. The development of a circumferential gable provides additional support for the sliding bearing elements in the hinge arms, thereby increasing the stability of the hinge. In addition, the sliding bearing elements can be particularly easily integrated into an automated handling process. In addition, the gables serve as a positioning aid of the sliding bearing elements in a casting mold for producing the hinge arms. It is necessary to hold the sliding bearing element in position in order to achieve a high accuracy in the hinge, especially in the manufacture of the hinge arms by means of a die casting process.

A preferred embodiment provides that the sliding bearing elements are formed cylindrically on the outer sides. The sliding bearing elements can be very easily yet precisely manufactured with the cylindrical embodiment of the outer sides. Furthermore, the cylindrical formation allows easy integration into existing hinge concepts or allows a simple redevelopment of a hinge.

Particularly advantageous is the development that the sliding bearing elements and/or the plain bearing bush have a circumferential labyrinth seal. Such a circumferential labyrinth seal prevents the ingress of dirt into the gaps between the sliding bearing elements and the plain bearing bush.

A further advantageous embodiment is that the plain bearing bush is formed of plastic. A plain bearing bush made of plastic can be very easily manufactured and assembled. In addition, plastics provide numerous different coefficients of friction, so that the desired or required coefficient of friction can be easily selected through this.

An advantageous embodiment of the invention provides that the plain bearing bush is a lifetime lubrication. The use of a lifetime lubrication provides an easy option to create a durable and reliable working hinge.

An advantageous embodiment of the invention provides that a lifetime lubrication is implemented in a sliding bearing element. The use of a lifetime lubrication provides an easy option to create a durable and reliable working hinge.

An embodiment of the hinge provides that a lifetime lubrication is introduced between the sliding bearing elements. This lifetime lubrication consists of a defined plastic. A lifetime lubrication made of plastic is very easy to manufacture and assemble. Furthermore, a targeted coefficient of friction of the sliding bearing element can be set via material parameterization.

An advantageous embodiment is that the sliding bearing elements have a slide coating. This provides the advantage that the sliding bearing elements, regardless of their solid material, allow for a smooth and virtually wear-free movement relative to one another. A defined movement of the hinge parts with respect to each other can be achieved with a predetermined defined coefficient of friction, whereby the respective desired haptics can be achieved.

An advantageous embodiment is that the sliding bearing elements have a slide coating. This provides the advantage of reducing wear in the hinge itself to a minimum.

According to an advantageous embodiment of the invention, it is provided that the slide coating is formed as a vapor-deposited coating, in particular PVD coating. Such a coating provides particular advantages for a permanent movement of the sliding bearing elements relative to each other, since the coating has a particularly low friction and thus a low wear. In addition, a defined coefficient of friction can be set via the coating, via which a defined wear can be set, whereby the service life of a hinge can be set very precisely to the desired specifications.

Particularly advantageous is the further development that the sliding bearing elements are made of stainless steel. Such designed sliding bearing elements provide a long-lasting and stable bearing of the hinge arms relative to each other. In addition, the sliding bearing elements provide an increased corrosion protection against environmental influences and result in a long-lasting hinge. A further advantage of stainless steel is the defined heat transfer. When the hinge arms are manufactured in a casting method, the defined heat conduction of the sliding bearing elements leads to a controlled heat dissipation to the plain bearing bush. If the dimensions are sufficiently large, the cooling of the melt in the casting process starts in a timely manner so as not to destroy the plain bearing bush by overheating. A targeted state can be set for the die casting process by utilizing the heat conduction of stainless steel.

A preferred embodiment provides that the hinge arms are formed of aluminum. The hinge arms manufactured from aluminum have an enormous advantage for vehicle construction, since this weight can be significantly saved compared to hinge arms conventionally manufactured from steel. The lower melting temperature of aluminum compared to steel also has the advantage that the material of the plain bearing bush, in particular the lifetime lubrication, is not destroyed by overheating.

A preferred embodiment provides that the hinge arms are formed of plastic. The hinge arms manufactured from plastic have an enormous weight advantage for vehicle construction and other applications, since this weight can be significantly saved compared to hinge arms conventionally manufactured from steel. The lower melting temperature of plastic compared to steel also has the advantage that the material of the plain bearing bush is not destroyed by overheating.

The invention further comprises a method for manufacturing a hinge according to the above and following description, wherein first
   a) the plain bearing bush is inserted between the two sliding bearing elements,
   b) melt then flows around the sliding bearing elements for the manufacture of the hinge arms, wherein the temperature of the melt so guided is that the sliding bearing elements heat up and thereby heat in a controlled manner this plain bearing bush arranged between these,
   c) wherein the heating of the plain bearing bush leads to the clearance in the hinge and the coefficient of friction being set in a controlled manner.

It is very easy to manufacture very precise hinges by means of such a method. The assembly of the sliding bearing elements with the plain bearing bush is quite easy to accomplish thanks to initially existing tolerances. The sliding bearing elements and the plain bearing bush can be joined together by a joining step using a defined force, without having this exercise of force lead to destruction of the plain bearing bush. The assembly of the plain bearing bush with the lifetime lubrication as a solid body is easy in the implementation based on defined tolerances. After this assembly, the sliding bearing elements are used together with the plain bearing bush in a casting mold in which the hinge arms are cast. The melt flowing around the sliding bearing elements in the casting mold heats the sliding bearing elements, whereby the plain bearing bush arranged between the sliding bearing elements is also heated. The heating of the plain bearing bush advantageously leads to the compensation of existing tolerances in the hinge thus manufactured. The die casting process is the most suitable for the manufacture of aluminum hinge arms. Plastic hinge arms are particularly suitable for injection molding. Defined parameters of the hinge can be set in a targeted manner by heating the plain bearing bush. Tolerances in the hinge can also be compensated and the bearing clearance and thus the bearing friction can be set in a targeted manner by heating the plain bearing bush.

An advantageous embodiment of the method is that the plain bearing bush between the sliding bearing elements is expanded by the heating and bears the material of the plain bearing bush against the sliding bearing elements. As the plain bearing bush expands, the material bears against the heated sliding bearing elements without sticking to them. This makes it possible to manufacture a particularly precise hinge in a particularly simple manner. In addition, the assembly of the plain bearing bush and the sliding bearing elements before expansion is easy due to defined and sufficient existing tolerances.

A particularly advantageous feature of the method is the further development that the plain bearing bush does not exceed a specific temperature value at a defined point due to a targeted temperature control. The control of the temperature in the melt is advantageously designed so that the plain bearing bush heats up only to a defined maximum temperature, which does not impair the function and shape of the sliding bearing element. For example, the sliding bearing elements can be made of stainless steel, which are cast in aluminum in order to form the hinge arms on the sliding bearing elements and to connect to these in a form-fitting manner. In the casting process, a plain bearing bush made of lifetime lubrication as a solid is located between the sliding bearing elements, which plain bearing bush consists, for example, of PTFE or other wear and temperature resistant plastic. The casting process must be carried out so that the plain bearing bush does not heat up beyond a maximum temperature value due to the heat conduction from the melt. This can be controlled in particular by the duration of the casting process, the cooling of the casting mold and by the masses and dimensions of the sliding bearing elements. On the other hand, a certain amount of heating, as explained above, is necessary so that the plastic material of the plain bearing bush fits snugly against the adjacent sliding bearing elements and thereby compensates for tolerances.

Particularly advantageous in the method is the further development that the plain bearing bush is heated up to a defined maximum temperature, preferably at most 315° C. The control of the temperature in the melt is advantageously designed so that the plain bearing bush heats up only to a defined maximum temperature, which does not impair the function and shape of the plain bearing bush. For example, the sliding bearing elements can be made of stainless steel, which are cast in aluminum in order to form the hinge arms on the sliding bearing elements and to connect to them firmly (form-fitting manner). In the casting process, the plain bearing bush is located between the sliding bearing elements, which plain bearing bush consists, for example, of PTFE or other wear and temperature resistant plastic. The casting process must be carried out so that the plain bearing bush does not heat up via the sliding bearing elements beyond a maximum temperature value due to the heat conduction from the melt. This can be controlled in particular by the duration of the casting process, the cooling of the casting mold and by the masses of the sliding bearing elements. On the other hand, a certain amount of heating, as explained above, is advantageous so that the plastic material of the plain bearing bush begins to flow and fits snugly against the adjacent sliding bearing elements, thereby compensating for tolerances.

Figure 2:
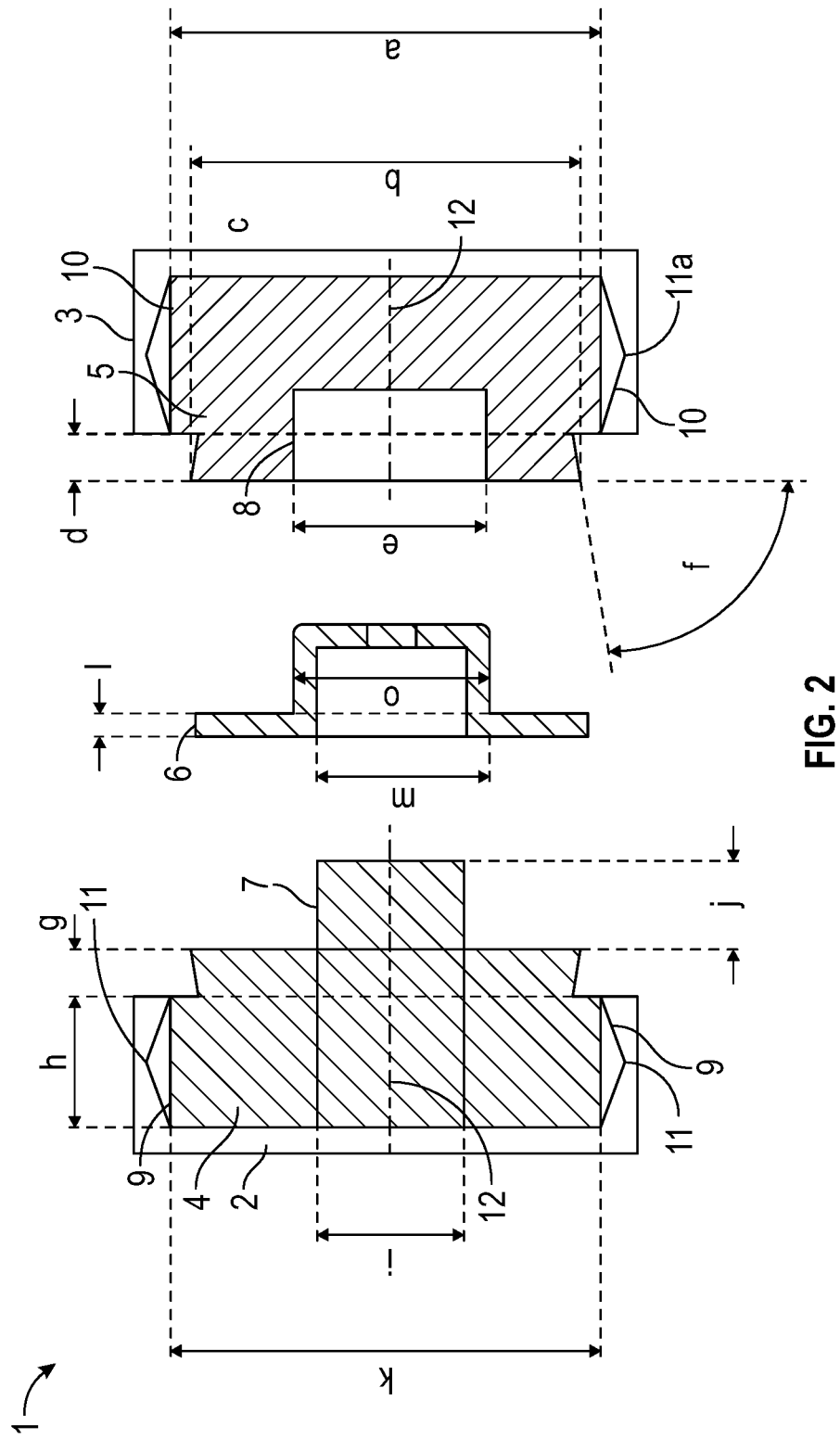
Figure 3:
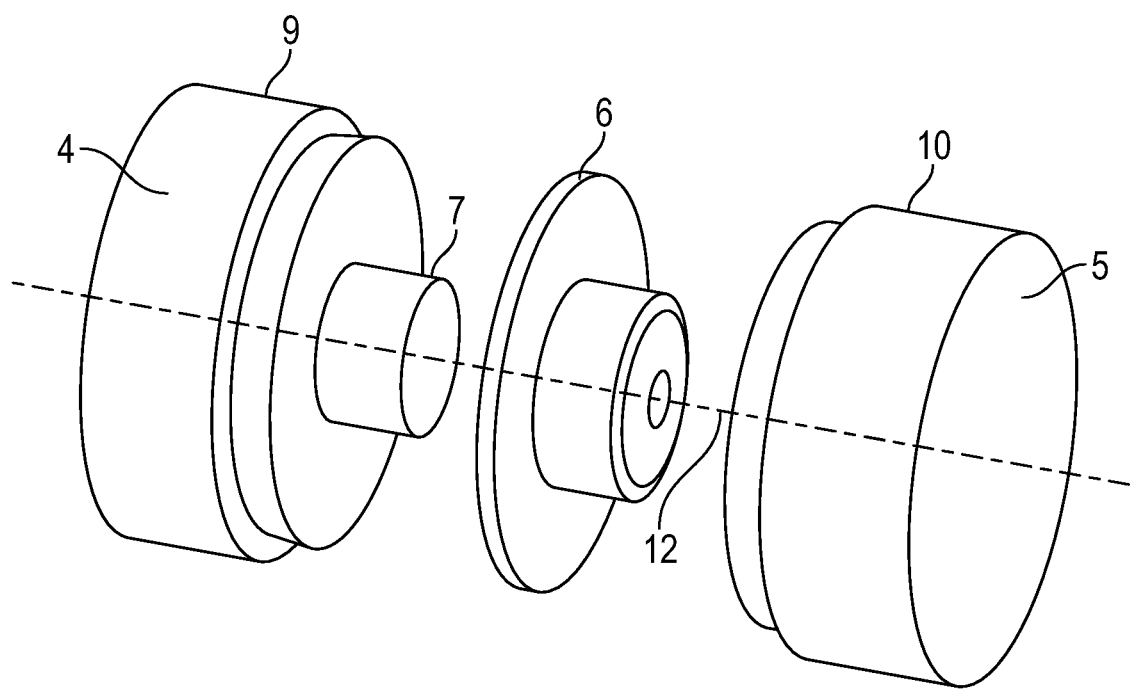

Further features, details and advantages of the invention are apparent from the following description and based on the drawings. Embodiments of the invention are shown schematically in the following drawings and are described in more detail below. Shown are:

FIG. 1: schematic sectional representation of a hinge according to the invention;

FIG. 2: schematic sectional representation of a hinge according to the invention in a modified embodiment;

FIG. 3: schematic detailed representation of a hinge according to the invention

A hinge according to the invention is shown schematically in FIG. 1, designated by the reference numeral 1. The representation according to FIG. 1 shows a sectional representation. Shown are the two hinge arms 2, 3 of the hinge 1, which hinge arms can be displaced in an articulated manner relative to each other. Each of the hinge arms 2, 3 receives a sliding bearing element 4, 5. A plain bearing bush 6 is arranged between the thus received sliding bearing elements 4, 5. For reasons of clarity, the representation according to FIG. 1 is designed as an exploded view, so that the sliding bearing elements 4, 5 and the plain bearing bush 6 are shown pulled apart along the hinge axis 12. In the fully assembled state, the plain bearing bush 6 bears against the sliding bearing elements 4, 5. The sliding bearing element 4 arranged on the left in the drawing has a centering formation 7, which in the assembled state is received in a receiving contour 8 of the sliding bearing element 5 arranged on the right in the drawing. The centering formation 7 is configured cylindrical, wherein the formed cylinder is arranged concentrically to the hinge axis 12. The likewise cylindrical receiving contour 8 arranged concentric to the hinge axis 12 allows secure bearing of the formation 7 on the hinge axis 12. The plain bearing bush 6, which is preferably formed from plastic, has a contour so that it can be arranged between the sliding bearing elements 4, 5. This is of particular advantage when the plain bearing bush 6 is a lifetime lubrication, because this ensures that no increased friction arises between sliding bearing elements 4, 5. Such a friction can also be prevented by the sliding bearing elements 4, 5 having a slide coating. This slide coating is preferably vapor-deposited by physical vapor deposition (PVD). As can be seen, the outer sides 9, 10 of the sliding bearing elements 4, 5 are also formed cylindrically in the embodiment shown here. However, the sliding bearing elements 4, 5 form a projection 13 so that the hinge arms 2, 3, can securely receive the sliding bearing elements 4, 5. While the sliding bearing elements 4, 5 are formed of stainless steel, the hinge arms 2, 3 are preferably formed of aluminum. This has particular advantages in the manufacture of the hinge 1 by means of the method according to the invention. That is because in the manufacture of the hinge 1, the plain bearing bush 6 is inserted between the two sliding bearing elements 4, 5. Subsequently, the sliding bearing elements 4, 5 are used together with the plain bearing bush 6 in a casting mold. The hinge arms 2, 3 are manufactured by melt flowing around the sliding bearing elements 4, 5 in the casting mold. The temperature of the melt is controlled in the manufacture of the hinge arms 2, 3 so that the sliding bearing elements 4, 5 heat up and thereby heat the plain bearing bush 6 arranged between the sliding bearing elements 4, 5. The heating of the plain bearing bush 6 leads to tolerances in the hinge 1 being compensated. This is ensured in particular by the fact that the hinge arms 2, 3, the sliding bearing elements 4, 5 and the plain bearing bush 6 are held in position by the casting mold until the materials cool. The tolerances are compensated particularly well when the material of the plain bearing bush 6 is expanded by the heating and bears against the sliding bearing elements 4, 5. The heating of the plain bearing bush 6 made of PTFE should be up to a maximum of about 315° C., so as not to impair the function and shape of the plain bearing bush 6. The melting temperature of PFTE is 327° C. A sufficient safety distance should be maintained from this value. In particular, the sliding bearing elements 4, 5 made of stainless steel can ensure that the cast aluminum for the hinge arms 2, 3 does not heat the plain bearing bush 6 too much. The stainless steel heats up sufficiently slowly and holds the temperature for a longer period of time. As a result, the plain bearing bush 6 can be heated in a controlled manner. The hereby initiated expansion leads to a thickening of the plastic, whereby the clearance of the hinge is reduced. Depending on the shape and size of the sliding bearing elements 4, 5 or the hinge arms 2, 3, it can be necessary to additionally actively cool the casting mold from the outside in order to prevent overheating of the sliding bearing elements 4, 5, in particular the plain bearing bush 6.

FIG. 2 shows a purely schematic representation of a sectional representation through a hinge 1 according to the invention in an embodiment slightly modified compared to FIG. 1. In contrast to FIG. 1, the sliding bearing elements 4, 5 have conically formed outer sides 9, 10, each forming a circumferential gable 11, 11a. As a result, the sliding bearing elements 4, 5 can be received particularly securely and stably by the hinge arms 2, 3. By the thus designed outer sides 9, 10, the hinge arms 2, 3 can be designed narrower and do not need to enclose the projection 13 (FIG. 1) to ensure a secure holding of the sliding bearing elements 4, 5.

FIG. 3 shows a perspective view of the sliding bearing elements 4, 5 according to the embodiment according to FIG. 1, the plain bearing bush 6 provided between the sliding bearing elements 4, 5, being arranged located on the hinge axis 12 between these sliding bearing elements 4, 5.

LIST OF REFERENCE CHARACTERS 1 hinge
2 hinge arm A
3 hinge arm B
4 sliding bearing element A
5 sliding bearing element B
6 plain bearing bushing
7 centering formation
8 receiving contour
9 outer side A
10 outer side B
11 11a, gable
12 hinge axis
13 projection
a diameter of sliding bearing element B
b diameter of projection on sliding bearing element B
c depth of sliding bearing element B
d depth of projection on sliding bearing element B
a diameter of receiving contour
f opening angle of projection
g depth of projection on sliding, bearing element A
h depth of sliding bearing element A
i diameter of formation
j length of formation
k diameter of sliding bearing element A
l thickness of plain bearing bush
m diameter of plain bearing bush
o diameter of plain bearing bush formation

The invention claimed is:

1. A hinge having two hinge arms that can be displaced in an articulated manner relative to each other, wherein each hinge arm receives respectively one sliding bearing element and a plain bearing bush is arranged between the sliding bearing elements, each of said sliding bearing elements being conically formed in the center on the outer sides and forming a circumferential gable.

2. The hinge according to claim 1, wherein one of the sliding bearing elements has a centering formation and the other sliding bearing element has a receiving contour receiving the centering formation.

3. The hinge according to claim 2, wherein the centering formation is configured cylindrical.

4. The hinge according to claim 1, wherein at least one of the sliding bearing elements and the plain bearing bush have a circumferential labyrinth seal.

5. The hinge according to claim 1, wherein the plain bearing bush is formed from plastic.

6. The hinge according to claim 1, wherein the plain bearing bush is a lifetime lubrication.

7. The hinge according to claim 1, wherein the sliding bearing elements have a slide coating.

8. The hinge according to claim 7, wherein the slide coating further comprises a PVD coating.

9. The hinge according to claim 1, wherein the sliding bearing elements are formed of stainless steel.

10. The hinge according to claim 1, wherein the hinge arms are formed of aluminum.

11. The hinge according to claim 1, wherein the hinge arms are formed of plastic.

12. A method for manufacturing a hinge, said method comprising:
 a) inserting a plain bearing bush between two sliding bearing elements,
 b) flowing melt around the sliding bearing elements for the manufacture of the hinge arms, and further comprising guiding the temperature of the melt such that the sliding bearing elements heat up, thereby heating the plain bearing bush arranged between the sliding bearings to a defined maximum temperature, and bearing the material of the plain bearing bush against the sliding bearing elements, thereby setting the clearance in the hinge and the coefficient of friction in a controlled manner.

* * * * *